US012567397B2

(12) United States Patent
Adarve Lozano

(10) Patent No.: US 12,567,397 B2
(45) Date of Patent: Mar. 3, 2026

(54) SYSTEM TO ELIMINATE SOUND NOISE INSIDE A RECEPTACLE

(71) Applicant: DEFENSYA INGENIERÍA INTERNACIONAL, S.L., Madrid (ES)

(72) Inventor: Alberto Adarve Lozano, Madrid (ES)

(73) Assignee: Defensya Ingeniería Internacional, S.L., Madrid (ES)

( * ) Notice: Subject to any disclaimer, the term of this patent is extended or adjusted under 35 U.S.C. 154(b) by 261 days.

(21) Appl. No.: 18/547,529

(22) PCT Filed: Feb. 25, 2021

(86) PCT No.: PCT/ES2021/070136
§ 371 (c)(1),
(2) Date: Aug. 23, 2023

(87) PCT Pub. No.: WO2022/180280
PCT Pub. Date: Sep. 1, 2022

(65) Prior Publication Data

US 2024/0054984 A1 Feb. 15, 2024

(51) Int. Cl.
*G10K 11/162* (2006.01)
*H01F 7/02* (2006.01)
*H01F 7/06* (2006.01)

(52) U.S. Cl.
CPC ............. *G10K 11/162* (2013.01); *H01F 7/02* (2013.01); *H01F 7/06* (2013.01)

(58) Field of Classification Search
CPC ........... G10K 11/162; H01F 7/02; H02K 7/06
See application file for complete search history.

(56) References Cited

U.S. PATENT DOCUMENTS 6,487,061 B1 * 11/2002 Swinbanks ............ F16M 11/12 361/160
2010/0232258 A1 * 9/2010 Kamata .................. G01V 13/00 367/13
2011/0075120 A1 * 3/2011 Ichinose ............. G03F 7/70775 355/53

FOREIGN PATENT DOCUMENTS

CN 107485851 A 12/2017
CN 108979791 A 12/2018
(Continued)

OTHER PUBLICATIONS

International Search Report issued in corresponding International Application No. PCT/ES2021/070136 mailed Nov. 8, 2021 (6 pages).
(Continued)

*Primary Examiner* — Forrest M Phillips
(74) *Attorney, Agent, or Firm* — Osha Bergman Watanabe & Burton LLP

(57) ABSTRACT

System that prevents the transmission of sound noise from the outside to a receptacle based on the use of a vacuum chamber that surrounds the receptacle to be protected, for this purpose the system comprises:

- A first receptacle (1), which is a hermetic one with rigid walls.
- A second receptacle (2) or outer receptacle enveloping the first receptacle and separated from the previous one by a separation chamber (3) and without any physical point of contact between the two receptacles, is also hermetic with rigid walls.
- Separating means (4) of the receptacles and maintainers of the separation chamber, consisting of electromagnetic means in a disposition facing between them, one on the outer face of the inner receptacle and the other on the inner face of the outer receptacle.

(Continued)

A system of extraction (5) of the gases in the separation chamber (3) between the two previous receptacles.

4 Claims, 1 Drawing Sheet

(56) References Cited

FOREIGN PATENT DOCUMENTS

| | | | |
|---|---|---|---|
| CN | 209259375 | U | 8/2019 |
| CN | 209467716 | U | 10/2019 |
| CN | 110410649 | A | 11/2019 |
| JP | S49129501 | A | 12/1974 |
| JP | 4511450 | B2 | 7/2010 |

OTHER PUBLICATIONS

Written Opinion issued in corresponding International Application No. PCT/ES2021/070136 mailed Nov. 8, 2021 (7 pages).

* cited by examiner

SYSTEM TO ELIMINATE SOUND NOISE INSIDE A RECEPTACLE

OBJECT OF INVENTION

It is the subject of the present invention, as the title of the invention establishes a system to eliminate the noise originated outside of a receptacle, at the inside of that receptacle. For example, such as in the cabin of an airplane where there is excessive noise due to the transmission of noise generated by the engines or by its friction against the air.

It characterizes the present invention the special design and configuration of each and every element that is part of the invention, as well as the functionality assigned to each of them so that working together, they produce a noise suppression system of sound originated at the outside of a receptacle which frequency is from a few hertz to more than decades of kilo-hertz, in a simple and efficient way.

Therefore, the present invention is confined within the scope of the suppressive systems of the transmission of noise within a receptacle.

BACKGROUND OF INVENTION

Within the state of the art there are solutions with active electronic elimination of ambient noise based on sound analysis by means of sound sensors (as microphones) and then generating a similar counterphase sound that counteracts the sound waves of the former eliminating by compensation the former.

The sound, to be transmitted, requires a medium that sustains the transmission of the pressure waves on which it is based. This nature allows the elimination of noise based on the elimination of the medium itself responsible for the transmission of these waves. If we manage to eliminate the medium as well as any other path that may be responsible for the transmission of the sound, we will have managed to stop every sound wave responsible for the noise to be eliminated and in this way the final objective of this invention will have been obtained.

Therefore, it has been chosen to develop systems based on the use of vacuum as a means that prevents the transmission of sound.

In prior art, the use of vacuum as a means of preventing sound transmission is known, as is the case in patent publications CN110410649, CN209467716U, CN108979791, CN107485851. However, in many cases vacuum chambers do not entirely surround the source of the sound or receptacle which you want to protect from sound. In addition, it also happens that they do not have means that allow to maintain in a stable way the separation between the receptacles defined by the vacuum chamber. In some cases, vibration or sound transmission, vibration-absorbing media placed in the separation chamber defined between the receptacles are used, as in patent CN209467716U, or in other cases positional stability between receptacles is achieved by springs as in patent CN209259375U.

In the state of the art the document JP4511450 B2, which discloses a vacuum magnetic levitated vibration absorbing anechoic box which comprises an inner box subjected at its inside to sound-absorbing treatment, an outer box for covering the inner box at its periphery, a neodymium magnet fixed to the outside of the inner box.

However, no document is known to define a system that prevents sound transmission based on the use of the complete vacuum between two receptacles. Without any physical means that may transmit vibrations or sound. Where said vacuum is generated in a chamber that completely surrounds the receptacle to protect from the outside sound and is interposed between the origin of the sound and the receptacle to protect. Where in addition, the means maintaining the positional and dimensional stability of the vacuum chamber can also be controlled at the user's will.

Consequently, it is the object of the present invention to develop a system protective of the transmission of sound within a receptacle that has the above characteristics as described below and is included in its essentiality in the first claim.

DESCRIPTION OF THE INVENTION

It is the subject of the present invention a system to eliminate noise of sound inside a receptacle and comprising:

- A first inner receptacle, inside which the suppression of sound noise from the outside is required. Where this first receptacle is a hermetic receptacle where the walls of this cabin must be sufficiently light and rigid like in a possible form of realization with light and resistant materials like bee panel-based sheets.
- A second receptacle or outer receptacle surrounding or wrapping the first receptacle and separated from the previous one by a separation chamber and without absolutely any physical point of contact between the two receptacles, where this second receptacle is also receptacle with hermetic, light and rigid walls.
- A separation chamber between the two receptacles in which vacuum has been created by means of a vacuum pump so that the transmission of sound waves through the camera is impossible as there is no transmitting media.
- Spacers means of both receptacles and maintainers of the separation chamber, consisting of electromagnetic means in front of each other: one on the outer face of the inner receptacle and the other on the inner face of the outer receptacle. The distancing media shall be placed in such a way that between each pair of them an electromagnetic force can be created that repels them and prevents them from coming together by inertia due to the movement of the receptacles or by shock of the elements that may be inside the first receptacle or inner receptacle.

Unless otherwise indicated, all the technical and scientific elements used in this report have the meaning usually understood by a normal expert in the technique to which this invention belongs. In the practice of the present invention, procedures and materials similar or equivalent to those described in the memory may be used. Throughout the description and claims the word "understands" and its variants are not intended to exclude other technical characteristics, additives, components or steps. For experts in the field, other objects, advantages and characteristics of the invention will be detached in part from the description and partly from the practice of the invention.

EXPLANATION OF FIGURES

To complement the description that is being made and in order to help a better understanding of the characteristics of the invention, according to a preferred example of practical realization, it is accompanied, as an integral part of that description, a set of drawings in which, for illustrative and not limiting purposes, the following has been represented.

PREFERENTIAL REALIZATION OF THE INVENTION

In the light of the figures, a preferred method of realization of the proposed invention is described below.

Figure 1:
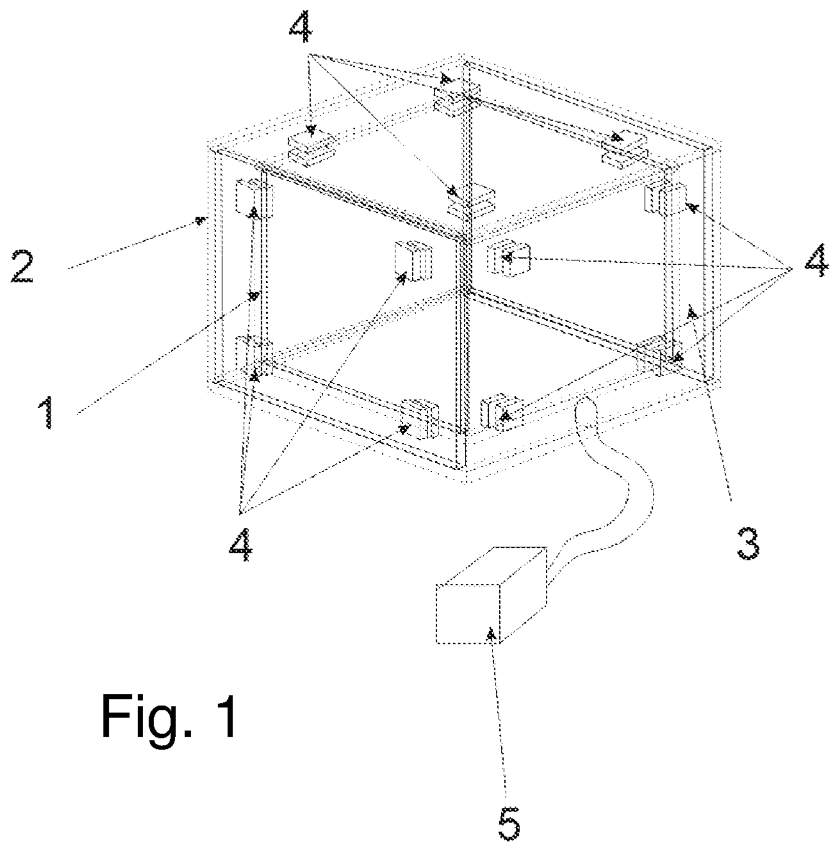
In FIG. 1, we can see a representation of a possible way of realization of the object of the invention.
Figure 2:
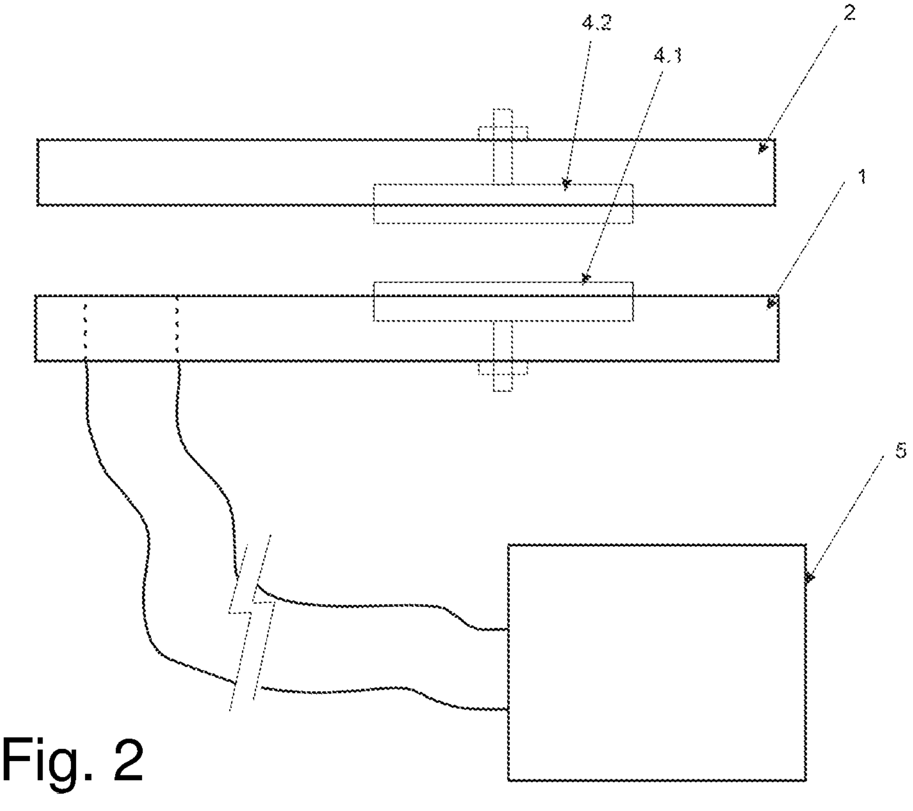
In FIG. 2, we can see a partial section of the walls of both receptacles in confronting arrangement.

In FIG. 1 we can see that a first receptacle (1) or inner receptacle, consisting of a cabin or room or enclosure, or enclosed space whose shape, without loss of generality, will be chosen as a hexahedron or cube. In this possible way of realization this first receptacle (1) has four vertical faces or walls, a horizontal face or base that we will call floor and another upper horizontal face that we will call roof. Regardless of the scale at which it is built, the validity remains constant because it does not depend on the size used. If it were big enough, we could call the receptacle a room.

This first receptacle is hermetic as it does not allow any fluid to pass through any of its faces, edges or vertices, any fluid, whether liquid or gaseous, since it is the receptacle inside which the suppression of sound noise will occur by avoiding the passage of waves from the outside. The walls are rigid and light, and in a possible form of realization can be honeycomb walls with materials that allow sufficient rigidity to prevent the opposite faces of the different receptacles from coming into contact.

Completely surrounding the first receptacle (1) or inner receptacle is a second receptacle (2) or outer receptacle that may have a similar shape, hexahedral or cubic and must be also hermetic.

The faces of both receptacles will generally be parallel as a first step to minimize the space or volume between them. The space between the two receptacles, the first receptacle (1) and the second receptacle (2), defines a chamber (3) where the vacuum is to be performed, up to a level at which the sound transmission is very highly attenuated and therefore inaudible. Vacuum in the chamber (3) is done by means of an extraction system. A possible form of realization for it is a vacuum pump (5).

Finally, the system has means of maintaining the separation (4) between receptacles based on electromagnetic means controlled from the outside and at will, such electromagnetic means are arranged in a face-to-face manner, so that a first (or all) electromagnetic medium (4.1) is placed on the outer face of the first receptacle (1) and a second electromagnetic medium (or set) (4.2) is placed on the inner face of the second receptacle (2) so that they can produce a magnetic repulsion between the two, which ensures the dimensional stability of the vacuum chamber (3) and therefore the separation between the first receptacle (1) and the second receptacle (2). Electromagnetic fields can be permanent or variable by passing a current through a set of coils. In a preferred first implementation, repulsion forces can be created with high-value permanent magnets or by high-strength electromagnets or by permanent high-strength magnets combined with high-strength electromagnets. Such magnets must be faced between them, either individually or in groups, to create high repulsion points or high repulsion zones between the inner and outer receptacles with sufficient forces to compensate for inertia and weights depending on the face or surface of the receptacles concerned.

When gases are extracted between the two receptacles with an adequate vacuum subsystem, the composite system will produce the desired effects and allow the exclusion of sound waves by preventing them from passing from the outside to the inner receptacle.

In addition, the system may also comprise one or more pressure sensors that allow the control and supervision of this magnitude in referred receptacles and the separation chamber between them.

Sufficiently described the nature of the present invention, as well as the way in which it is implemented, it is stated that, within its essentiality, it may be implemented in other forms of realization that differ in detail from that indicated by way of example, and to which it will also achieve the protection that is sought, provided that it does not alter, change or modify its fundamental principle.

The invention claimed is:

1. A system to eliminate sound noise inside a receptacle to protect sound transmission at least in the audible range comprising:

a first receptacle or inner receptacle in which the suppression of sound noise from the outside is achieved, where this first receptacle is a hermetic receptacle with rigid walls, a second receptacle or outer receptacle enveloping the first receptacle and separated from the first receptacle by a separation chamber and without any physical point of contact between the two receptacles, where this second receptacle is also a hermetic receptacle with rigid walls, a separation chamber, located between the two receptacles and in which vacuum is practiced by means of a vacuum pump so that the transmission of sound waves through the chamber is impossible since there is no transmitting media, some distancing media of the receptacles and maintainers of the separation chamber, consisting of magnetic or electromagnetic media in a position facing at least one on the outer face of the inner receptacle and of the outer receptacle, where the spacer media shall be placed so that between each pair of them or between each group of them an electromagnetic force can be created that repels them and prevents them from coming together by inertia due to the movement of the receptacles, by shocking of any element there could inside the first receptacle or inner receptacle or by the weight inside the latter receptacle, characterized in that:

the walls of the first receptacle sheets based on a honeycomb panel, light and resistant are used, wherein the repulsion fields between adjacent receptacles are generated by permanent high-strength magnets combined with high-strength electromagnets controlled from the outside, also includes one or more pressure sensors that allow the control and supervision of this magnitude in and between receptacles, wherein said receptacles are held spaced apart solely by electromagnetic means comprising face-to-face permanent magnets combined with electromagnets controlled from outside, the electromagnets being automatically regulated in response to pressure measured by one or more sensors arranged to monitor the vacuum within said separation chamber.

2. The system to eliminate sound noise inside a receptacle according to claim 1 wherein in the manufacture of the walls of the first receptacle sheets based on resistant materials are used.

3. The system to eliminate sound noise inside a receptacle according to claim 1 wherein the repulsion fields between adjacent receptacles are generated by permanent magnets of big force.

4. The system to eliminate sound noise inside a receptacle according to claim 1 wherein the repulsion fields between adjacent receptacles are generated by high force electromagnets.

* * * * *